United States Patent
Mikami et al.

(10) Patent No.: US 10,473,002 B2
(45) Date of Patent: Nov. 12, 2019

(54) POPPET VALVE AND METHOD FOR MANUFACTURING SAME

(71) Applicant: Nittan Valve Co., Ltd., Hadano-shi, Kanagawa (JP)

(72) Inventors: Maiku Mikami, Hadano (JP); Kazunori Kurahashi, Kanagawa (JP)

(73) Assignee: Nittan Valve Co., Ltd., Hadano-Shi, Kanagawa (JP)

( * ) Notice: Subject to any disclaimer, the term of this patent is extended or adjusted under 35 U.S.C. 154(b) by 335 days.

(21) Appl. No.: 15/425,028

(22) Filed: Feb. 6, 2017

(65) Prior Publication Data

US 2017/0211434 A1 Jul. 27, 2017

Related U.S. Application Data

(63) Continuation-in-part of application No. PCT/JP2014/072398, filed on Aug. 27, 2014.

(51) Int. Cl.
*B23P 15/00* (2006.01)
*F01L 3/20* (2006.01)
(Continued)

(52) U.S. Cl.
CPC ............... *F01L 3/20* (2013.01); *B21K 1/22* (2013.01); *B23P 15/002* (2013.01); *F01L 3/02* (2013.01);
(Continued)

(58) Field of Classification Search
CPC . F01L 3/20; F01L 3/02; F01L 2820/02; F01L 2103/00; F01L 2103/01;
(Continued)

(56) References Cited

U.S. PATENT DOCUMENTS

| 4,547,229 A * | 10/1985 | Larson ................. C21D 1/26 |
| | | 123/188.2 |
| 6,295,731 B1 * | 10/2001 | Yamakawa ............ F01L 3/02 |
| | | 123/188.4 |
| 2014/0283384 A1 | 9/2014 | Kurahashi et al. |

FOREIGN PATENT DOCUMENTS

| CN | 103797220 A | 5/2014 |
| EP | 1094202 A2 | 4/2001 |
(Continued)

OTHER PUBLICATIONS

International Search Report of PCT/JP2014/072398 dated Nov. 25, 2014.
(Continued)

*Primary Examiner* — Sarang Afzali
*Assistant Examiner* — Ruth G Hidalgo-Hernandez
(74) *Attorney, Agent, or Firm* — Shlomo S. Moshen; David W. Barman (57) ABSTRACT

A method for manufacturing a poppet valve 10 from an intermediate valve products is disclosed. The intermediate valve products have an intermediate valve head 14' with a pressing protrusions 15. A peak 15a of the pressing protrusions 15 is located in a normal direction X2 of the seat surface N, which is positioned on a normal line X2 passing a reference point P3 set on a line segment K connecting a base point P1 in an inner side and a base point P2 in an outer side of the seat surface N; a position of the reference point P3 is set such that a relation between a length L1 from the base point P1 to the reference point P3 and a length L2 from the base point P2 to the reference point P3 meets a formula of L1/L2≤0.5.

7 Claims, 7 Drawing Sheets

(51) Int. Cl.
  *B21K 1/22* (2006.01)
  *F01L 3/02* (2006.01)
  *C21D 7/02* (2006.01)
  *C21D 7/13* (2006.01)
  *C21D 9/00* (2006.01)
(52) U.S. Cl.
  CPC .................. *C21D 7/02* (2013.01); *C21D 7/13* (2013.01); *C21D 9/0068* (2013.01); *F01L 2103/00* (2013.01); *F01L 2103/01* (2013.01); *F01L 2820/02* (2013.01)
(58) Field of Classification Search
  CPC ....... B23P 15/002; B21K 1/22; C21D 9/0068; C21D 7/02; C21D 7/13; Y10T 29/49428
  See application file for complete search history.

(56) References Cited

FOREIGN PATENT DOCUMENTS

| | | |
|---|---|---|
| EP | 2740908 A1 | 6/2014 |
| EP | 2767687 A1 | 8/2014 |
| EP | 2933445 A1 | 10/2015 |
| JP | 59-185540 A | 10/1984 |
| JP | 08-049512 A | 2/1996 |
| JP | 2001-115808 A | 4/2001 |
| JP | 2001-123256 A | 5/2001 |
| JP | 2012-045604 A | 3/2012 |
| JP | 5575991 B2 | 8/2014 |
| WO | 2014014069 A1 | 1/2014 |

OTHER PUBLICATIONS

Notification of Reasons for Refusal of Japan Patent Application No. 2015-505742 dated Mar. 17, 2015.
Notification of Reason for Refusal of Korean Patent Application No. 10-2015-7011195 dated Sep. 6, 2015.
International Preliminary Report on Patentability of PCT/JP2014/072398 dated Feb. 28, 2017.
Extended European Search Report of European Patent Application No. 14896279.8 dated Mar. 8, 2017.
First Search Report of Chinese Patent Application No. 2014800029120 dated Oct. 22, 2015.

\* cited by examiner

● the poppet valve 10 manufactured by the present invention's method

▲ the poppet valve manufactured by the relevant art's method

POPPET VALVE AND METHOD FOR MANUFACTURING SAME

FIELD OF THE INVENTION

The invention relates to a poppet valve and a method for manufacturing the poppet valve.

BACKGROUND OF THE INVENTION

An intake/exhaust valve (hereinafter, referred to as "poppet valve") used in an internal combustion engine of marines and the like has a basic configuration in which a valve head is formed integrally with one end of a valve stem in a longitudinal direction, and the valve head of the poppet valve is provided with a seat surface formed to be inclined in a direction where an outer diameter becomes larger toward the one end of the valve stem. The poppet valve performs a linear/reciprocal motion in a cylinder head in synchronization with timings of intake and exhaust of the internal combustion engine. In these timings, the seat surface of the poppet valve repeatedly collides with a metallic seat ring disposed in an opening of each of intake and exhaust ports, and therefore the stiffness strength of the seat surface of the poppet valve is required.

Patent Document 1 discloses the technique in which in an intermediate valve products before forging, a pressing protrusions is provided in a region serving as a seat surface of a poppet valve that will be finally obtained, and the seat surface of the poppet valve that will be finally obtained is subjected to work hardening by pressing the pressing protrusions at forging for plastic-deformation, thus improving the stiffness strength of the produced poppet valve.

Patent Document 1 is Japanese Patent Laid-Open No. 2001-123256 A.

Figures 6A, 6B:
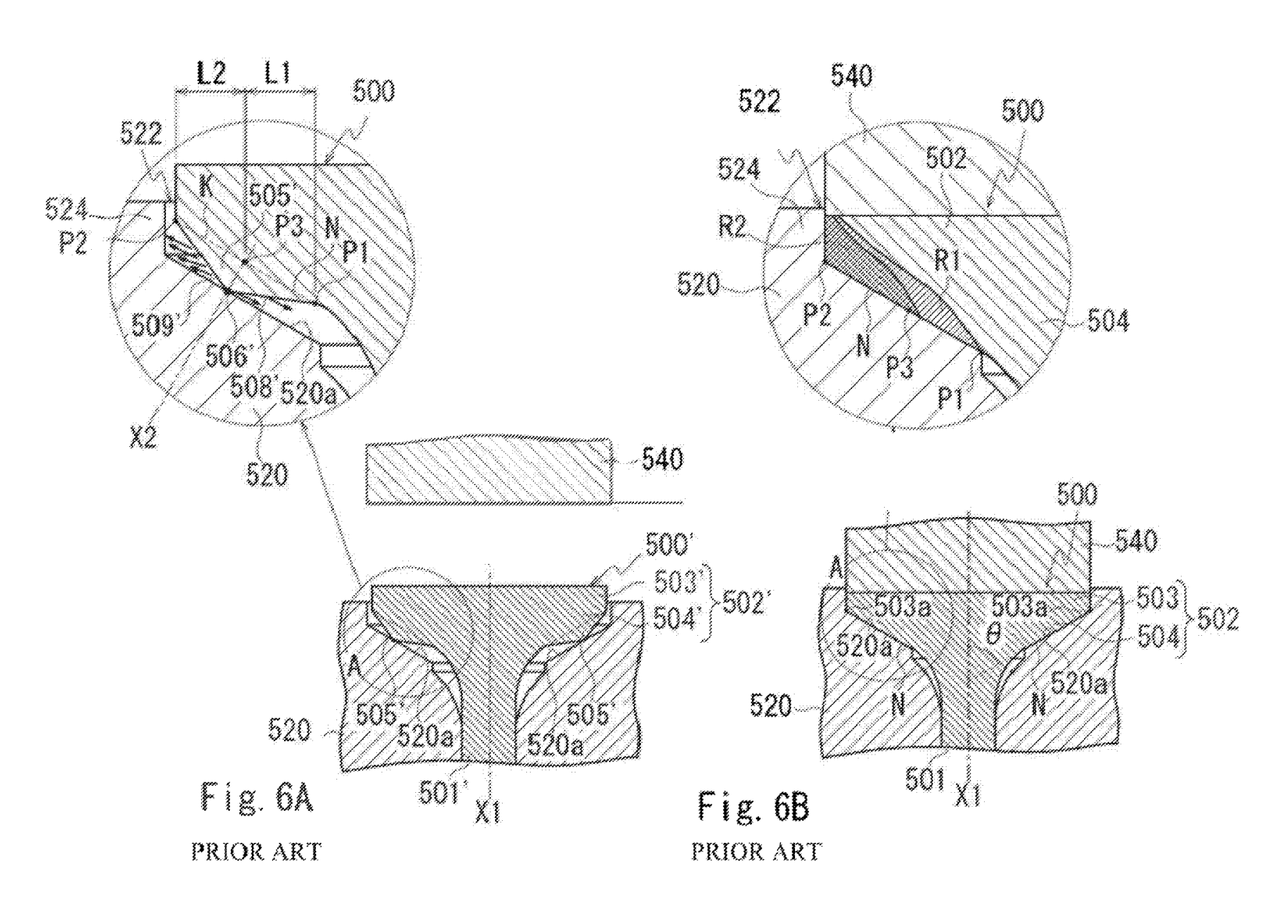

FIG. 6 shows a method for forging a poppet valve 500 disclosed in Patent Document 1, wherein FIG. 6 (a) shows a shape of an intermediate valve products 500' before forging, and FIG. 6 (b) shows a shape of an intermediate valve products 500 after forging.

In FIG. 6 (a), a shape (outer shape) of a seat surface in the intermediate valve products 500 will be finally obtained is illustrated in a broken line, and is illustrated to overlap the intermediate valve products 500' before forging.

As illustrated FIG. 6(b), the intermediate valve products 500 after forging have a basic configuration in which a valve head 502 is formed integrally with one end of a valve stem 501 in a longitudinal direction. The valve stem 501 is a bar-shaped member linearly extending along a center axis X1 of the valve stem 501, and the valve head 502 formed in one end of the valve stem 501 includes a columnar margin portion 503 and a seat portion 504 having an outer diameter in a radial direction of the center axis X1 that is the smaller according to being more away from the margin portion 503. The seat portion 504 is provided with a seat surface N that is inclined at a predetermined angle θ with respect to the center axis X1, and in a sectional view, and the seat surface N is formed in a planar shape toward the center axis X1 from a boundary point 503a to the margin portion 503.

As illustrated in FIG. 6 (a), the intermediate valve products 500' before producing the poppet valve 500 by forging are provided with a swollen portion 505' swelling in a direction of being away from a margin portion 503' in a region serving as the seat portion 504 after forging.

Here, for forging the shape of the poppet valve 500, the intermediate valve products 500' are held in a state where the pressing protrusions 505' is in contact with a pressing surface 520a of a die 520 as a forging die. In this state, a punch 540 arranged to face the die 520 is moved to the die 520 along the center axis X1, and thereby a shape of an intermediate valve head 502' in the intermediate valve products 500' is adjusted to a shape of the valve head 502 in the poppet valve 500 that will be finally obtained.

SUMMARY OF THE INVENTION

Technical Problem

Here, a position of a peak 506' of the pressing protrusions 505' in the Intermediate valve products 500' will be explained on a basis of the seat surface N of the poppet valve 500 that will be finally obtained. As illustrated in FIG. 6(a), in a sectional view, the peak 506' is positioned on a normal line X2 passing a reference point P3 that is an intermediate point of a line segment K in the length direction, connecting a base point P2 in an outer diameter side and a base point P1 in an inner diameter side in the region serving as the seat surface N.

Therefore in a sectional view, the pressing protrusions 505' are formed in a shape of an isosceles triangle of inclined surfaces 508', 509' having the same length for connection between the peak 506' and the base points P1, P2.

In addition, in the isosceles triangle, a position of the reference point P3 is set such that a relation between a length L1 from the base point P1 in the inner diameter side to the reference point P3 in a radial direction of the center axis X1 and a length L2 from the reference point P3 to the base point P2 in the outer diameter side in the radial direction of the center axis X1 meets the following formula:

$$L1/L2=1$$

Here, as viewed in the axial direction of the center axis X1, the peak 506' of the pressing protrusions 505' is positioned closer to the radial outside than the reference point P3 in the width direction of the seat surface N as viewed in the same direction. Therefore, when the intermediate valve products 500' are forged, most of the portion of the pressing protrusions 505' pressed by the pressing surface 520a of the die 520 results in moving closer to the radial outside than the reference point P3.

Then, as illustrated in FIG. 6(b), in the forged poppet valve 500, in a region R2 closer to the radial outside than the reference point P3 of the seat surface N, the amount of the portion that has been plastic-deformed and has moved is more dense in a region R2 in the radial outside from the reference point P3 of the seat surface N than in a region R1 in the radial inside. Therefore there is a tendency that the stiffness strength of the seat surface N is higher in the outer diameter side than in the inner diameter side.

Therefore it is required that for producing a poppet valve by forging, the stiffness strength of the seat surface of the produced poppet valve is made possible to be more uniform.

Solution to Problem

According to the present invention, a method for manufacturing a poppet valve, in which a valve head provided in one end of a valve stem in a longitudinal direction has a seat surface in a direction where an outer diameter is widened toward the one end, by forging an intermediate product of the poppet valve, wherein:

the intermediate product of the poppet valve is provided with a large diameter part as the valve head in the one end of the valve stem in the longitudinal direction, wherein the large diameter part is provided with a pressing protrusions in a region serving as the seat surface after forging, the pressing protrusions having a peak positioned in a normal direction of the seat surface on a basis of the seat surface of the forged valve head;

in a sectional view, the peak of the pressing protrusions is positioned on a normal line passing a reference point set on a virtual line connecting a base point in an inner diameter side and a base point in an outer diameter side of the seat surface; and as viewed in an axial direction of a center line of the valve stem, a position of the reference point is set such that a relation between a length L1 from the base point in the inner diameter side to the reference point and a length L2 from the base point in the outer diameter side to the reference point meets the following formula (1):

$$0<L1/L2\leq 0.5 \qquad (1),$$

the method comprising the steps of:

providing a pressing die and a supporting die arranged to face with each other in the center line;

supporting the valve intermediate product by the supporting die in a state of causing the pressing protrusions to abut on a pressing surface of the supporting die between the pressing die and the supporting die, the pressing surface having a shape corresponding to the seat surface;

thereafter moving the pressing die in a direction of approaching the supporting die in the center line direction to plastic-deform a region of the pressing protrusions held between the pressing die and the supporting die in the center line direction; and thereby forming the seat surface.

Advantageous Effects of Invention

According to the present invention, the portion of the pressing protrusions that is pressed and moves by the pressing surface of the supporting die moves in the region finally serving as the seat surface from the inner diameter side to the outer diameter side. Therefore, the amount of the portion that has been plastic-deformed and has moved is substantially uniformly distributed on the seat surface of the valve that will be finally obtained. Accordingly, the stiffness strength of the seat surface in the poppet valve produced by forging can be made to be more uniform.

BRIEF DESCRIPTION OF THE DRAWINGS

Further features and advantages of the invention will become apparent from reading the following detailed description in conjunction with the following drawings, in which like reference numbers refer to like parts:

FIGS. 5 (a)-(d) are diagrams showing stiffness strength of a seat surface in the poppet valve according to the embodiment.

FIGS. 6 (a)-(b) are diagrams showing a method for manufacturing a poppet valve according to a conventional example.

DETAILED DESCRIPTION

The examples and the referenced drawings in this detailed description are merely exemplary, and should not be used to limit the scope of the claims in any claim construction or interpretation.

Hereinafter, an explanation will be made of a method for manufacturing a poppet valve according to an embodiment of the present invention. First, an explanation will be made of a poppet valve 10 produced by forging and a intermediate valve products 10' before forging.

Figure 1A:
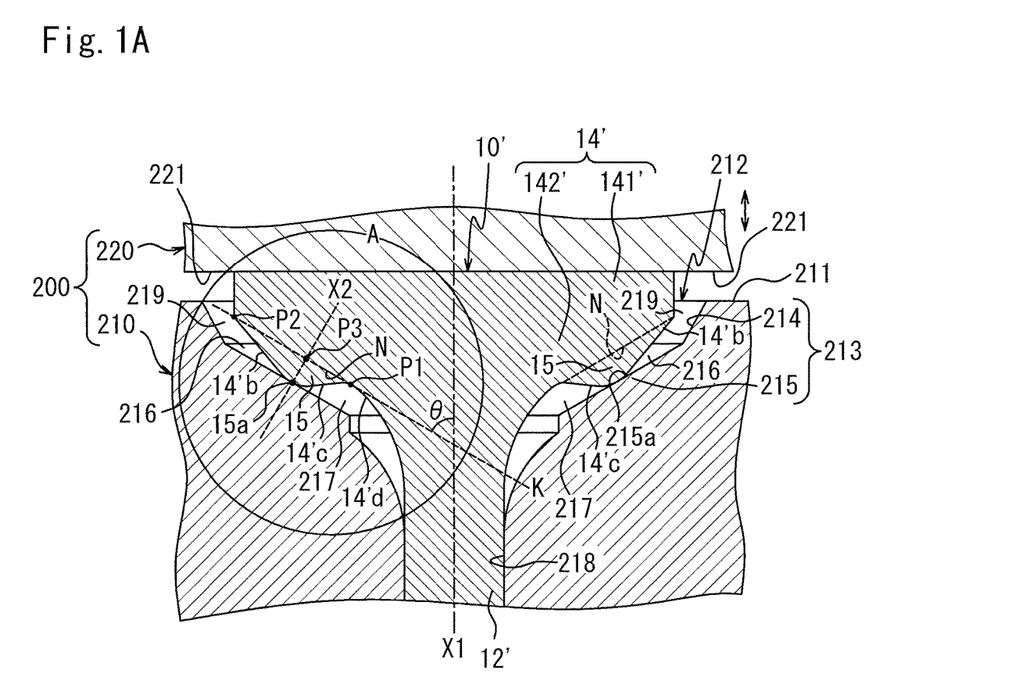
FIGS. 1(a) and (b) are diagrams illustrating a poppet valve and intermediate valve products according to an embodiment in the present invention.
Figure 1B:
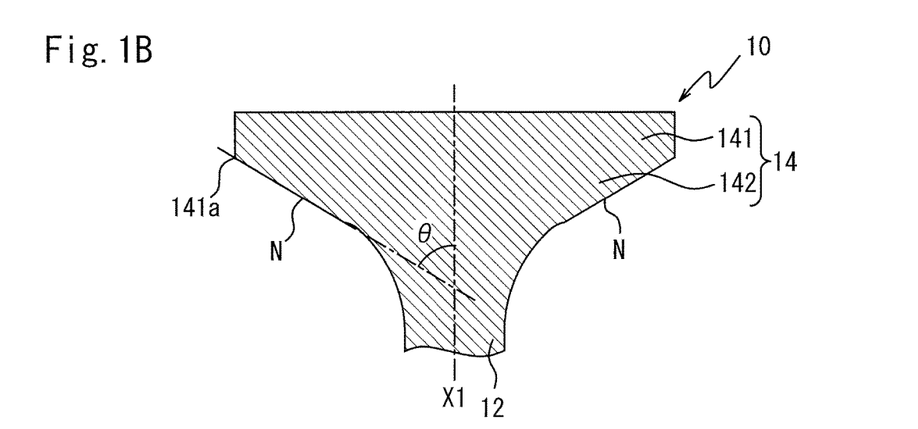

FIGS. 1(a) and (b) are diagrams illustrating the intermediate valve products 10' and the poppet valve 10 produced by forging the intermediate valve products 10', wherein (a) in FIG. 1 is a sectional view illustrating a primary part of the intermediate valve products 10' together with a forging die 200, and (b) in FIG. 1 is a sectional view illustrating a primary part of the poppet valve 10 finally produced by forging.

Figure 2A:
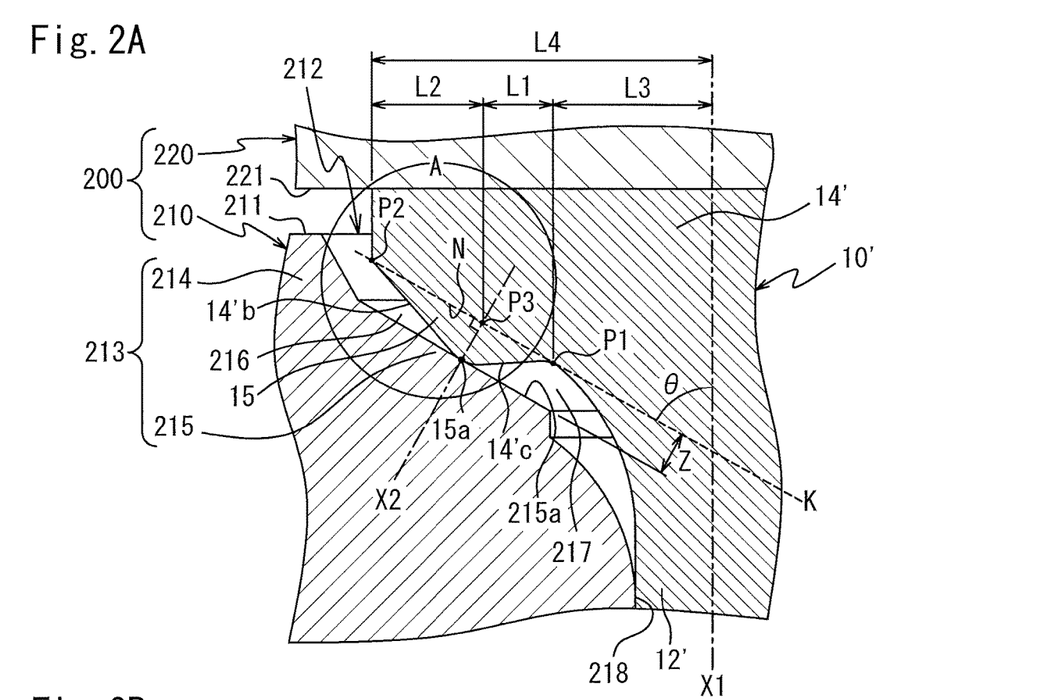
FIGS. 2(a)-(c) are partially enlarged diagrams illustrating the intermediate valve products according to the embodiment.
Figure 2B:
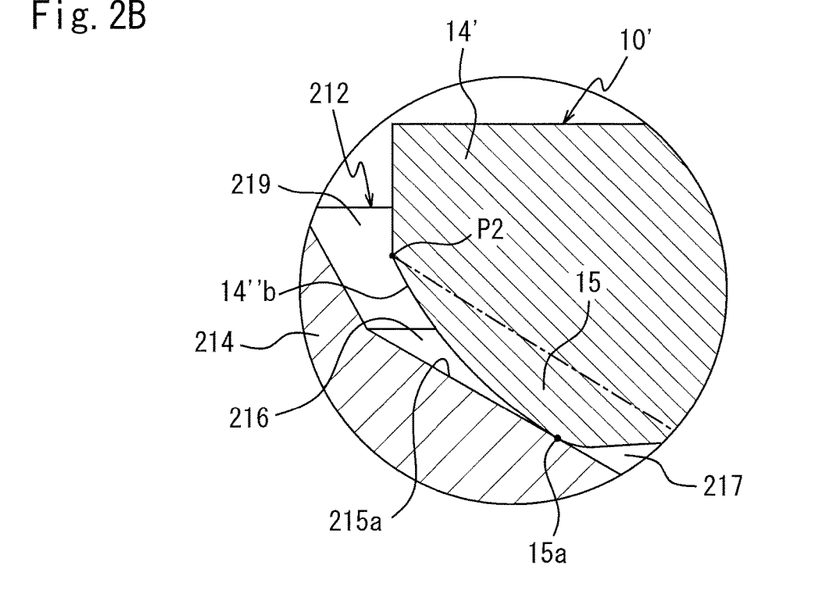

FIG. 2(a) is an enlarged diagram of a region A in FIG. 1(a), and FIG. 2(b) is a diagram illustrating a modification of the shape of the region A in pressing protrusions 15. It should be noted that in FIG. 1(a) and in FIGS. 2(a) and (b), in the intermediate valve products 10' before forging, a position of a seat surface N in the poppet valve 10 that will be finally obtained is illustrated in a broken line.

As illustrated in FIG. 1(b), the poppet valve 10 produced by forging has a basic configuration in which a valve head 14 is formed integrally with one end of a valve stem 12 in a longitudinal direction. The valve stem 12 is a bar-shaped member linearly extending along a center axis X1 of the valve stem 12, and the valve head 14 formed in one end of the valve stem 12 includes a columnar margin portion 141, and a seat portion 142 having an outer diameter in a radial direction of the center axis X1 that is the smaller according to being more away from the margin portion 141.

The seat portion 142 is provided with a seat surface N that is inclined at a predetermined angle θ with respect to the center axis X1, and in a sectional view, the seat surface N is formed in a linear shape toward the center axis X1 from a boundary point 141a to the margin portion 141. In the embodiment, the inclination angle θ of the seat surface N is set to a range of 45°≤θ≤600.

The intermediate valve products 10' before producing the poppet valve 10 by forging are provided with an intermediate valve head 14' serving as the valve head 14 after forging, formed in one end of a columnar valve stem 12', and in the embodiment, the intermediate valve products 10' are formed of a precipitation-hardened Ni-based alloy.

As illustrated in FIG. 1(a), the intermediate valve head 14' includes a columnar margin portion 141', and a seat portion 142' having an outer diameter in a radial direction of the center axis X1 that is the smaller according to being more away from the margin portion 141', and the seat portion 142' is provided with the pressing protrusions 15 swelling in a normal direction of the seat surface N on a basis of the seat surface N (refer to a wave line in the figure) of the poppet valve 10 that will be finally obtained.

The pressing protrusions 15 are a region serving as the seat surface N after forging, and a peak 15a of the pressing protrusions 15 is positioned on a normal line X2 passing a reference point P3 set on a line segment K connecting a base point P2 in an outer diameter side and a base point P1 in an inner diameter side of the seat surface N after forging. Here, the pressing protrusions 15 are provided with an inclined surface 14'b connecting the base point P2 in the outer diameter side and the peak 15a, and an inclined surface 14'c connecting the base point P1 in the inner diameter side and the peak 15a, which are respectively formed in a linear shape. In a sectional view, the pressing protrusions 15 are formed in a scalene triangle. In addition, the peak 15a of the pressing protrusions 15 are subjected to curved surface processing and in a sectional view, the peak 15a is formed not in a sharp shape but in a round shape.

As illustrated in FIG. 2(a), in the embodiment, for controlling a moving direction of the portion of the pressing protrusions 15 that is plastic-deformed at forging, the position of the reference point P3 as viewed in the axial direction of the center axis X1 is set such that a relation between a length L1 from the base point P1 in the inner diameter side to the reference point P3 in the radial direction of the center axis X1 and a length L2 from the reference point P3 to the base point P2 in the outer diameter side in the radial direction of the center axis X1 meets the following formula (1):

$$0 < L1/L2 \leq 0.5 \tag{1}$$

It should be noted that more preferably, and as shown in FIG. 2(a), the position of the reference point P3 as viewed in the axial direction of the center axis X1 is set such that a relation between the length L1 from the base point P1 in the inner diameter side to the reference point P3 in the radial direction of the center axis X1, the length L2 from the reference point P3 to the base point P2 in the outer diameter side in the radial direction of the center axis X1, a length L3 from the center axis X1 to the base point P1 in the inner diameter side in the radial direction of the center axis X1, a length L4 from the center axis X1 to the base point P2 in the outer diameter side in the radial direction of the center axis X1, a height Z from the seat surface N to the peak 15a of the pressing protrusions 15, and an angle θ of the seat surface N to the center axis X1 meets the following formulae (2a)-(2c):

$$L2 > L1 \tag{2a}$$

$$(L4-L3) \times \tfrac{1}{2} \leq L2 \leq (L4-L3) \times \tfrac{3}{4} \tag{2b}$$

$$L1 = Z \times SIN^2 \theta / COS\, \theta \tag{2c}$$

The formula 2(b) defines that the length L2 is set to the range of ½ to ¾ of the difference between the length L4 and the length L3 (L4−L3). The purpose for defining the length L2 to this range is to set the position of the peak 15a of the pressing protrusions 15 in the radial direction of the central axis X1 to be nearer to the base point P1 in the inner diameter side than to the base point P2 in the outer diameter side of the pressing protrusions 15.

Regarding the formula 2(c), the process of determining the formula 2(c) will be explained below with reference to FIG. 2(c).

Figure 2C:
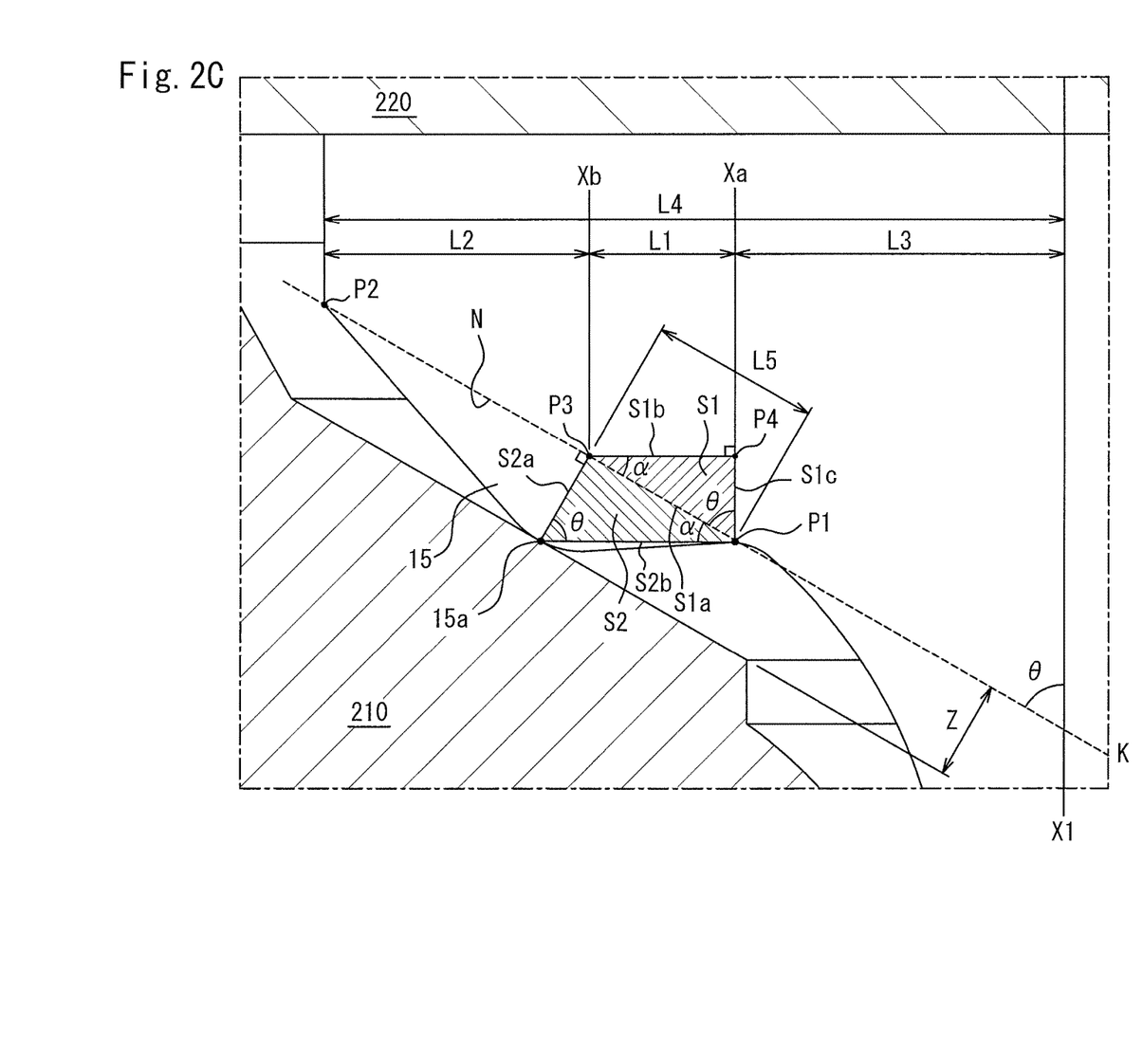

FIG. 2(c) is a view illustrating the peak 15a of the pressing protrusions 15. FIG. 2(c) shows the position of the peak 15a as viewed in the axial direction of the center line X1 and the length L1 from the base point P1 in the inner diameter side to the reference point P3 by using the height Z from the seat surface N to the peak 15a.

As shown in FIG. 2(c), the reference point 3 is an intersection point of the seat surface N (the line segment K) and a line (line segment S2a) perpendicularly drawn from the peak 15a of the pressing protrusions 15 to the seat surface N. The length L1 as viewed in the axial direction of the center line X1 is a distance between the reference point P3 and the base point P1 in the inner diameter side of the pressing protrusions 15.

P4 is an intersection point of a line segment Xa and a line segment S1b. The line segment S1b is a line perpendicularly drawn from the reference point P3 to the line segment Xa that is parallel to the central axis X1 and passes through the base point P1 in the inner diameter side.

Each of the reference point P3, the base point P1 and the intersection point P4 is an apex of a right triangle S1. In the right triangle S1, the length L1 corresponds to the length of the line segment S1b that linearly connects the reference point P3 and the intersection point P4.

A line segment S1a (a part of the line segment K) of the right triangle S1 linearly connects the reference point P3 and the base point P1 and is situated on the line segment K that is along the seat surface N. The line segment S1b linearly connects the reference point P3 and the intersection point P4 and is perpendicular to the central axis X1. The line segment S1c linearly connects the base point P1 and the intersection point P4 and is situated on the line segment Xa that is parallel to the central axis.

Furthermore, the line segment S1b is perpendicular to the line segment S1c. The line segment S1b is perpendicular to the central axis X1. The line segment S1c is situated on the line segment Xa that is parallel to the central axis X1. Accordingly, an intersection angle θ of the line segment S1a to the line segment S1c is equal to an intersection angle θ of the central axis X1 to the seat surface N (the line segment K).

The line segment S1a is the hypotenuse of the right triangle S1. The line segment S1b that linearly extends from the reference point P3 to the direction perpendicular to the central axis X1 is the opposite side of the right triangle S1. The line segment S1c that linearly extends from the base point P1 to the direction parallel to the central axis X1 is the adjacent side of the right triangle S1. In this embodiment, the length of the line segment S1a (hypotenuse) is a length L5. L5 is a length from the reference point P3 to the base point P1 along the line segment K (the seat surface N). The length of the line segment S1b (opposite side) is L1.

According to the above-mentioned relations of the right triangle S1, the following formula (e) can be derived to determine the length L1 by using the trigonometric function (d):

$$SIN\, \theta = S1b/S1a = L1/L5 \tag{d}$$

$$L1 = L5 \times SIN\, \theta \tag{e}$$

The length L5 in the formula (e) can be determined by using another right triangle S2. The right triangle S2 is situated on the opposite side of the right triangle S1 with the seat surface N (the line segment K) therebetween. Three apices of the right triangle S2 are the peak 15a of the pressing protrusions 15, the reference point P3 and the base point P1. The right triangle S2 has a common side (the line segment S1a) with the right triangle S1. That is, the hypotenuse of the right triangle S1 is common with an opposite side of the right triangle S2.

The line segment S2b of the right triangle S2 that linearly connects the base point P1 and the peak 15a is the hypotenuse of the right triangle S2. The line segment S1a that linearly connects the reference point P3 and the base point P1 is the opposite side of the right triangle S2. The line segment S2a that linearly connects the seat surface N (the reference point P3) and the peak 15a is the adjacent side of the right triangle S2. The length of the line segment S1a (the opposite side) is the length L5, and the length of the line segment S2a (the adjacent side) is the height Z.

It should be noted that the line segment S2b of the right triangle S2 is perpendicular to the central axis X1 and is parallel to the line segment S1b of the right triangle S1.

The intersection angle of the line segment S2b to the seat surface N (the line segment K) is the same as the intersection angle α (90'−θ) of the line segment S1b to the seat surface N (the line segment K), since the line segment S2b and the line segment S1b is parallel. Similarly, the intersection angle of the line segment S2a to the line segment S1a is the same (90°) as the intersection angle of the line segment S1b to the line segment S1c.

That is, the right triangle S2 is a similar right triangle to the right triangle S1, since two of the interior angles (intersection angle α, intersection angle 90°) thereof are the same. Accordingly, the remaining interior angle of the right triangle S2, i.e., the intersection angle θ of the line segment S2a to the line segment S2b is the same as the intersection angle θ of the line segment S1a to the line segment S1c of the right triangle S1.

According to the above-mentioned relations of the right triangle S2, the following formula (g) can be derived to determine the length L5 by using the trigonometric function (f):

$$\text{TAN } \theta = S1a/S2a = L5/Z \tag{f}$$

$$L5 = Z \times \text{TAN } \theta \tag{g}$$

If the formula (g) is substituted into L5 of the formula (e), the following formula (h) is derived:

$$L1 = (Z \times \text{TAN } \theta) \times \text{SIN } \theta \tag{h}$$

In the formula (h), "TAN θ" can be replaced with "SIN θ/COS θ", and thus the formula 2c is finally obtained:

$$L1 = Z \times \text{SIN}^2 \theta / \text{COS } \theta \tag{2c}$$

In addition, the height Z from the seat surface N to the peak 15a of the pressing protrusions 15 is set such that a relation between the height Z and the length L3 from the center axis X1 to the base point P1 in the inner diameter side in the radial direction of the center axis X1, the length L4 from the center axis X1 to the base point P2 in the outer diameter side in the radial direction of the center axis X1, and the angle θ of the seat surface N to the center axis X1 meets the following formula (3):

$$Z < ((L4 - L3) \times \text{COS } \theta)/2 \tag{3}$$

Here, as illustrated in FIG. 2(a), a forging die 200 used for forging the intermediate valve products 10' includes a die 210 (supporting die) holding the intermediate valve products 10', and a punch 220 (pressing die) arranged to face the die 210.

The punch 220 is forward/backward-movable along the axial direction of the center axis X1 by a drive device not illustrated. At the time of forging the intermediate valve products 10', the punch 220 presses the intermediate valve products 10' held between the punch 220 and the die 210 to the die 210 by moving the punch 220 to the die 210 along the axial direction of the center axis X1 to plastic-deform the intermediate valve products 10' for adjustment to the shape of the poppet valve 10.

A die hole 212 opens on an upper surface 211 of the die 210 at the punch 220-side to hold the intermediate valve head 14' of the intermediate valve products 10', and the intermediate valve products 10' are inserted in the die hole 212 from the valve stem 12'-side.

The die hole 212 is formed in a shape in which an inner diameter is the smaller according to being more away from the punch 220, and an inner wall 213 surrounding the die hole 212 includes an opening wall 214 at the upper surface 211-side and a pressing wall 215 continuous to the opening wall 214 at the opposite to the punch 220. The pressing wall 215 is inclined in a direction of getting closer to the center axis X1 according to being more away from the punch 220, and an intersection angle of the pressing wall 215 to the center axis X1 is the same angle θ as the inclination angle of the seat surface N of the poppet valve 10 after forging.

At the time of forging of the intermediate valve products 10', an inner side surface of the pressing wall 215 serves as a pressing surface 215a that presses the pressing protrusions 15 provided in the intermediate valve head 14' of the intermediate valve products 10', and the pressing surface 215a is formed in a shape corresponding to the shape of the seat surface N of the poppet valve 10 that will be finally obtained. It should be noted that at the process before forging, the intermediate valve products 10' are supported by the die 210 in a state where the pressing protrusions 15 abuts on the pressing surface 215a.

In this state, spaces 216, 217 are ensured in an outer diameter side and in an inner diameter side centered at an abutting point between the pressing protrusions 15 and the pressing surface 215a between the intermediate valve products 10' and the pressing surface 215a of the die 210. The space 216 is formed between the pressing surface 215a and the inclined surface 14'b of the pressing protrusions 15, and the space 217 is formed between the pressing surface 215a and the inclined surface 14'c of the pressing protrusions 15, and the respective spaces 217, 271 are used for runoff of the portion of the pressing protrusions 15 that is pressed by the pressing surface 215a at forging to be plastic-deformed and move.

As viewed in the axial direction of the center axis X1, a hole 218 communicating with the hole 212 opens on the central part of the die hole 212, and the hole 218 is formed along the center axis X1.

An inner diameter of the hole 218 is formed to match an outer diameter of the valve stem 12' of the intermediate valve products 10', and at the time of holding the intermediate valve products 10' by the die 210, the valve stem 12' of the intermediate valve products 10' is inserted in the hole 218 to hold the intermediate valve products 10' in a predetermined position along the axial direction of the center axis X1.

Next, an explanation will be made of plastic deformation of the pressing protrusions 15 in the intermediate valve products 10' by forging.

Figure 3A:
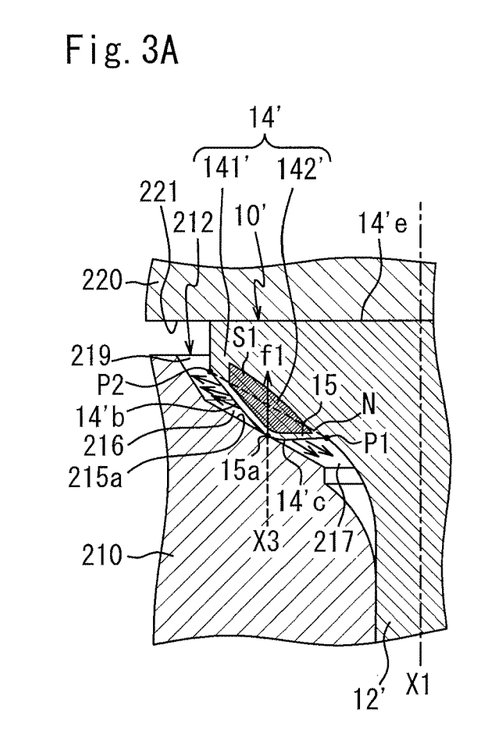
FIGS. 3(a)-(c) are diagrams showing a shape change of the intermediate valve products in the forging process according to the embodiment.
Figure 3B:
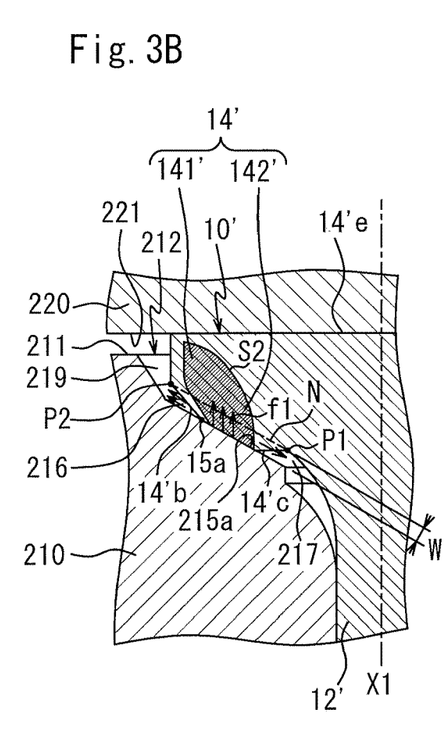
Figure 3C:
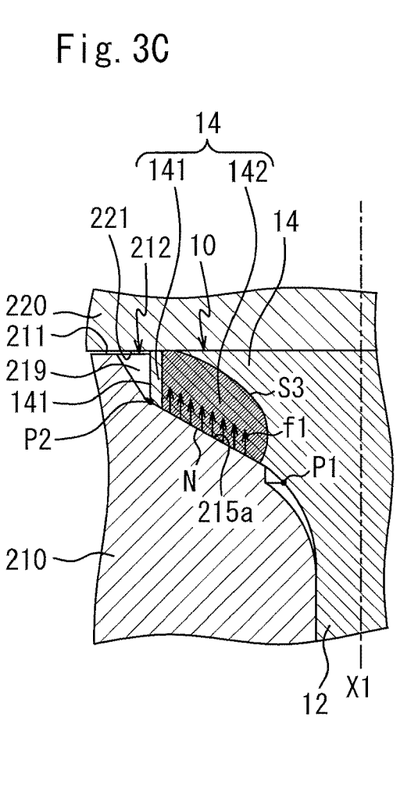

FIGS. 3(a)-(c) are diagrams showing the forging process of the intermediate valve products 10', wherein FIG. 3(a) is a primary part sectional view explaining an initial stage of the forging process for the intermediate valve products 10', FIG. 3(b) is a primary part sectional view explaining a midway stage of the forging process for the intermediate valve products 10, and FIG. 3(c) is a primary part sectional view explaining a post-forging stage for the intermediate valve products 10'.

The punch 220 is moved to the die 210 along the center axis X1 to press an upper surface 14'e of the intermediate valve products 10' held by the die hole 212 of the die 210 with a lower surface 221 facing the die 210 in the punch 220. Thereby, the swollen pat 15 of the intermediate valve products 10' is pressed on the pressing surface 215a of the die 210 from the axial direction of the center axis X1. Therefore the peak 15a of the pressing protrusions 15 is subjected to stress (reaction force) f1 from the pressing surface 215a (refer to (a) of FIG. 3). The stress f1 passes the peak 15a of the pressing protrusions 15 and acts upward toward the punch 220 along a straight line X3 in parallel to the center axis X1 (refer to stress f1 shown in a sign in the figure).

Here, the peak 15a of the pressing protrusions 15 is subjected to curved surface processing, and in a sectional view, the peak 15a is formed not in a sharp shape but in a round shape. Therefore at the time of forging the intermediate valve products 10', the pressing surface 215a of the die 210 makes contact with a wider range of a portion (portion in the round shape) of the pressing protrusions 15 subjected to the curved surface processing than in a case where the peak 15a is formed in the sharp shape. Thereby the stress f1 acting on the pressing protrusions 15 from the pressing surface 215a uniformly acts in a wider range than in a case where the peak 15a is formed in the sharp shape. Therefore even if the position of the peak 15a varies more or less, the moving direction of the portion in the pressing protrusions 15 can be controlled to the same direction. In addition, since it is possible to prevent excessive stress concentration on the peak 15a of the pressing protrusions 15 by executing the curved surface processing to the peak 15a, even in a case where a size of the intermediate valve products 10' is large to increase loads on the peak 15a at forging, occurrence of manufacture defects can be reduced.

It should be noted that in a case where the peak 15a is formed in the sharp shape, since the pressing surface 215a makes point contact with the peak 15a of the pressing protrusions 15, the stress f1 acts only on the peak 15a of the pressing protrusions 15. Therefore, since the moving direction of the portion of the pressing protrusions 15 changes according to variations in position of the peak 15a, the moving direction of the portion becomes more unstable than in a case where the peak 15a is formed in the round shape (it is difficult to control the moving direction of the portion).

In the above embodiment, the curvature R in curved surface processing of the peak 15a in the pressing protrusions 15 is set to meet a relation of 2 mm≤R≤10 mm, and thereby the moving direction of the portion in the pressing protrusions 15 can be controlled more than in a case where the peak 15a is formed in the sharp shape.

When the stress f1 from the pressing surface 215a of the die 210 acts on the pressing protrusions 15 in the intermediate valve products 10', the peak 15a of the pressing protrusions 15 and a portion close thereto are pressed to the pressing surface 215a in the axial direction of the center axis X1 by the stress f1 from the pressing surface 215a to be plastic-deformed and move. Here, the spaces 216, 217 to which the portion of the pressing protrusions 15 that is pressed to move can run off are ensured in the outer diameter side and the inner diameter side centered at the peak 15a. Therefore the portion of the pressing protrusions 15 pressed by the pressing surface 215a flows into the spaces 216, 217 in the outer diameter side and the inner diameter side centered at the peak 15a, and moves upward toward the punch 220.

Here, since the pressing surface 215a of the die 210 is inclined in a direction of being away from the center axis X1 toward the upward to the punch 220-side, the portion of the pressing protrusions 15 that is pressed by the pressing surface 215a to be plastic-deformed and move moves to the outer diameter side of the peak 15a more than to the inner diameter side (center axis X1-side).

As described above, in the embodiment, the position of the peak 15a in the pressing protrusions 15 is set based upon the relation expressed in the following formula (1), and the position of the peak 15a as viewed in the axial direction of the center axis X1 is arranged closer to the base point P1 in the inner diameter side than the base point P2 in the outer diameter side of the seat surface N that will be finally obtained:

$$0 < L1/L2 \leq 0.5 \tag{1}$$

L1 is a length from the base point P1 in the inner diameter side to the reference point P3 in the radial direction of the center axis X1, and L2 is a length from the reference point P3 to the base point P2 in the outer diameter side in the radial direction of the center axis X1.

Here, when the intermediate valve products 10' are pressed by the punch 220, the portion of the pressing protrusions 15 is pressed into the inside of the pressing protrusions 15 and moves to the inner diameter side (base point P1-side) and the outer diameter side (base point P2-side) on a basis of the peak 15a of the pressing protrusions 15.

In addition, the portion of the pressing protrusions 15 on which the pressing force acts from the peak 15a tends to more easily move to the outer diameter side than to the inner diameter side.

Therefore, when the position of the peak 15a of the pressing protrusions 15 is set as described above, the portion of the pressing protrusions 15 that is pressed by the pressing surface 215a at forging to move comes across the region finally serving as the seat surface N from the inner diameter side (the center axis X1-side) to the outer diameter side to move. As a result, a region S1 in which the density of the plastic-deformed portion is high is formed in the region finally serving as the seat surface N over a wide range in the radial direction of the center axis X1 (refer to hatching in FIG. 3(a)).

As illustrated in FIG. 3(b), when the forging of the intermediate valve products 10' is developed by further pressing the punch 220 into the die 210-side along the center axis X1, the more portions of the pressing protrusions 15 are pressed into the inside of the pressing protrusions 15, while being plastic-deformed and moving toward the outer diameter side and the inner diameter side. Then, since the portion that has been plastic-deformed and has moved is more dense in the deep side and in the outer diameter side of the pressing protrusions 15, there is formed a region S2 where the work hardening is performed to the deep side of the pressing protrusions 15, as well as to the outer diameter side (refer to hatching in (b) of FIG. 3). At a point illustrated in FIG. 3(b), the portion of the pressing protrusions 15 making contact with the pressing surface 215a of the die 210 has a substantially uniform thickness W on a basis of the seat surface N that will be finally formed.

As illustrated in FIG. 3(c), at a final stage of forging, the pressing protrusions 15 of the intermediate valve products 10' in FIG. 3(a) are adjusted to the shape of the seat surface N of the poppet valve 10 that will be finally obtained by forging. At this time, the portion of the pressing protrusions 15 that has had the substantially uniform thickness W at a point of FIG. 3(b) is uniformly pressed into the seat surface N-side by the pressing surface 215a, and the seat surface N with high density is formed by the plastic deformation. Thereby, the poppet valve 10 having the seat surface N will be finally obtained. That is, as a result of the plastic deformation of the pressing protrusion 15, the pressing protrusions 15 are substantially uniformly distributed over all the region of the seat surface, and thus, the region with high stiffness strength is formed inside the seat surface N with a predetermined depth.

Here, when the amount of the portion of the pressing protrusions 15 in the intermediate valve products 10' are large, the portion of the pressing protrusions 15 pressed by the pressing surface 215a may possibly move further to the outer diameter side over the space 216 at the outer diameter side for runoff of the plastic-deformed portion. Assuming that a relation between the punch 220 and the die 210 illustrated in FIGS. 1(a) and (b), FIGS. 2(a) and (b), and FIGS. 3(a)-(c) are, as in the case of the conventional forging die illustrated in FIG. 6(b), made such that a punch 540 is inserted into the opening wall 524 surrounding the die hole 522 of the die 520, the movement of the portion of the pressing protrusions 15 that is plastic-deformed and moves at forging to the outer diameter side is blocked. Then, the movement of the portion is blocked in the middle of the forging, and the portion that has moved to the outer diameter side of the seat surface N that will be finally formed is not widened. Therefore the forged seat surface N is not uniformly work-hardened to the outer diameter side.

In the embodiment of the present invention, an intersection angle of the opening wall 214 with the center axis X1 illustrated in FIG. 1 is smaller than an intersection angle of the pressing wall 215 with the center axis X1, and, at forging, the lower surface 221 of the punch 220 and the upper surface 211 of the die 210 abut against each other (refer to (c) of FIG. 3). Therefore, a runoff part 219 formed to be interposed between the opening wall 214 and the margin portion 141' of the intermediate valve head 14' is formed closer to the outer diameter side than the space 217 in a state of holding the intermediate valve products 10' on the pressing surface 215a of the die hole 212 in the die 210.

As a result, in a case where the amount of the portion of the pressing protrusions 15 in the intermediate valve products 10' are large, the portion of the pressing protrusions 15 that is plastic-deformed and moves to the outer diameter side can flow in the runoff part 219 over the space 216 after the space 216 is filled with the portion, and the movement of the portion of the pressing protrusions 15 by the plastic deformation is certainly performed to the final forging stage. Therefore the forged seat surface N is certainly work-hardened to the outer diameter side.

In this manner, since the peak 15a of the pressing protrusions 15 in the intermediate valve products 10' before forging is positioned closer to the base point P1 in the inner diameter side than the base point P2 in the outer diameter side, the portion of the pressing protrusions 15 that is pressed and moves at forging comes across the region finally serving as the seat surface N from the inner diameter side to the outer diameter side.

Therefore, on the seat surface N of the poppet valve 10 that will be finally obtained, the amount of the portion of the pressing protrusions 15 that has been plastic-deformed and has moved is substantially uniformly distributed across a range in the vicinity from the base point P1 in the inner diameter side to the base point P2 in the inner diameter side, and to the predetermined depth of the seat surface N (refer to FIG. 3(c)).

Accordingly, at the time of producing the poppet valve 10 by forging, a nearly entire region 53 from the inner diameter side to the outer diameter side of the seat surface N of the poppet valve finally obtained is subjected to plastic deformation to be work-hardened. Therefore the stiffness strength can be made to be more uniform (refer to hatching in FIG. 3(c)).

The forging of the intermediate valve products 10' using the aforementioned forging die 200 is executed by cold forging or warm forging executed at a temperature less than the recrystallization temperature.

Next an explanation will be made of the method for manufacturing the poppet valve 10.

Figure 4:
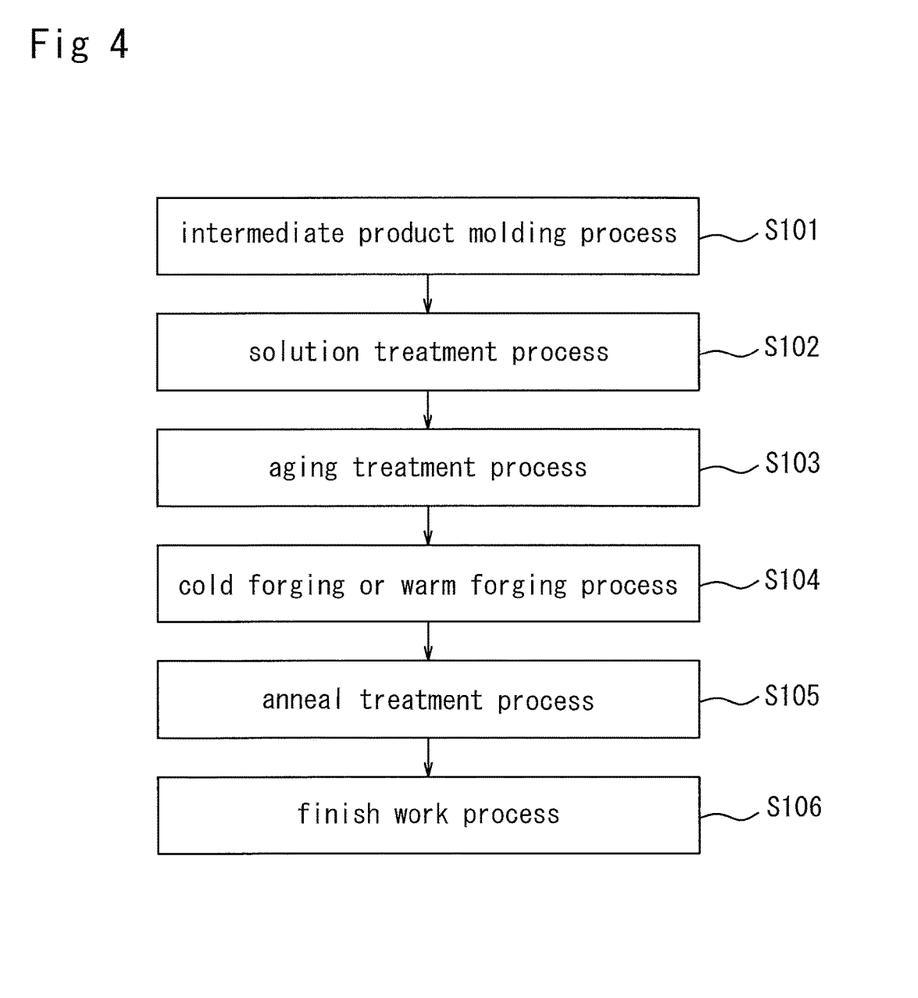
FIG. 4 is a flow chart illustrating a method for manufacturing the poppet valve according to the embodiment.

FIG. 4 is a flow chart illustrating the method for manufacturing the poppet valve 10.

First, at step S101, a basic configuration of the intermediate valve products 10' before forging is formed. Specifically, the intermediate valve head 14' is formed on a longitudinal, one end of the valve stem 12', a base material of which is a precipitation-hardened Ni-based alloy by forging or the like (intermediate product molding process).

At step S102, after heating the intermediate valve products 10' at a predetermined temperature, the intermediate valve products 10' are rapidly cooled (solution treatment process). For example, in a case where the intermediate valve products 10' are the precipitation-hardened Ni-based alloy, the intermediate valve products 10' are heated at a constant temperature in a range of 1000° C. to 1100° C., and thereafter, is rapidly cooled.

Here, in a case of no heat treatment, a metallic structure forming the intermediate valve products 10' is in a non-uniform state.

As described above, when the intermediate valve products 10' are heated and held, material components of the intermediate valve products 10' are uniformly melted. Accordingly, by rapidly cooling the intermediate valve products 10' in this state, the metallic structure can be made in a uniform state (solution).

At step S103, the intermediate valve products 10' that have been cooled at step S102 are heated for a given time at a constant temperature lower than the heating temperature at step S102 (aging treatment process). For example, in a case where the intermediate valve products 10' are the precipitation-hardened Ni-based alloy, the intermediate valve products 10' are heated at a constant temperature in a range of 400° C. to 700° C. for 120 to 300 minutes.

As a result, a metallic crystal of the intermediate valve products 10' via the solution treatment process (step S102) is micro-structured to obtain hardened precipitated substances in a crystal grain boundary. Therefore material hardness can be further increased (aging hardening).

At step S104, the intermediate valve products 10' are forged under temperature conditions less than the recrystallization temperature of metal forming the intermediate valve products 10' to be molded to the shape of the poppet valve 10, and further harden the forged valve seat (cold forging or warm forging process). The temperature less than the recrystallization temperature is in a temperature range of 20 to 500° C. in a case where the intermediate valve products 10' are the precipitation-hardened Ni-based alloy, for example.

In this manner, the intermediate valve products 10' hardened at the solution treatment process (step S102) and the aging treatment process (step S103) is subjected to cold forging or warm forging, thereby making it possible to further harden the seat surface N of the poppet valve 10 in combination with work hardening.

At step S105, the forged poppet valve 10 are heated at a temperature lower than the aging treatment temperature at step S103 to remove stress in the metal (anneal treatment process).

At final step S106, the forged poppet valve 10 is finished to a final product shape by cutting or the like (finish work process). Work precision and surface roughness of the seat surface N of the forged poppet valve 10 can be further improved by finishing the seat surface N by cutting work. In addition, the uniformly work-hardened layer to the predetermined depth is formed under the seat surface N, and it is possible to cause the uniformly work-hardened layer to emerge on the surface by cutting the seat surface N.

Next, an explanation will be made of the measurement result of the stiffness strength in the seat surface N of the forged poppet valve 10. FIG. 5(*a*) is a diagram explaining measurement spots of the stiffness strength on the seat surface N. FIG. 5(*b*) is a diagram explaining the measurement result of the stiffness strength in a position N1 in the inner diameter side in the seat surface N. FIG. 5(*c*) is a diagram explaining the measurement result of the stiffness strength in a position N2 in an intermediate point between the inner diameter side and the outer diameter side in the seat surface N, and FIG. 5(*d*) is a diagram explaining the measurement result of the stiffness strength in a position N3 in the outer diameter side in the seat surface N.

In FIG. 5(*a*), the seat surface N of the poppet valve 10 is shown in a solid line, and a seat surface NA of the final product shape is shown in a broken line.

In FIGS. 5(*b*)-(*d*), for comparison of stiffness strength, there are shown the results obtained by measuring stiffness strength of the seat surface N of the poppet valve 10 manufactured by the manufacture method in the present invention and stiffness strength of a seat surface of a poppet valve manufactured by the manufacture method in the issued patent (Japanese Patent No. 2925945) of an applicant of the present application (hereinafter, referred to as "conventional poppet valve") on the same condition. In these figures, the measurement result of the poppet valve 10 manufactured by the manufacture method in the present invention is described in a black circle sign, and the measurement result of the poppet valve in the conventional product is described in a black triangle sign.

It should be noted that the measurement of the stiffness strength of the seat surface was performed using a Vickers strength tester according to a Vickers hardness testing method stipulated in JISZ2244.

As illustrated in FIG. 5(*a*), in a section of the seat surface N of the poppet valve 10 manufactured by the manufacture method in the present invention, the stiffness strength of the poppet valve as a final product was measured in a range from the surface of the seat surface NA to the depth of 5 mm at intervals each having 1 mm in the respective positions of the position N1 in the inner diameter side, the position N2 in an intermediate point between the inner diameter and the outer diameter side, and the position N3 in the outer diameter side. It should be noted that the stiffness strength of the seat surface in the conventional poppet valve was measured in the same positions.

Figure 5A:
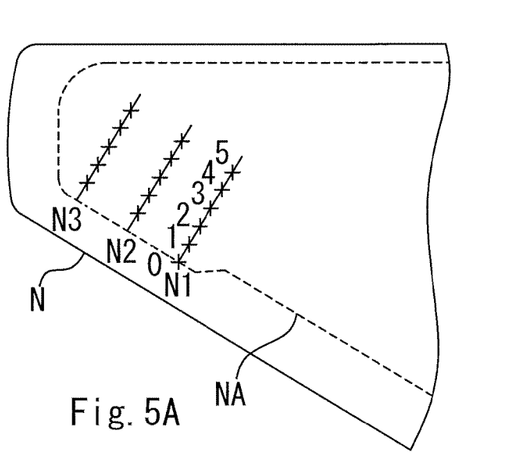
Figure 5B:
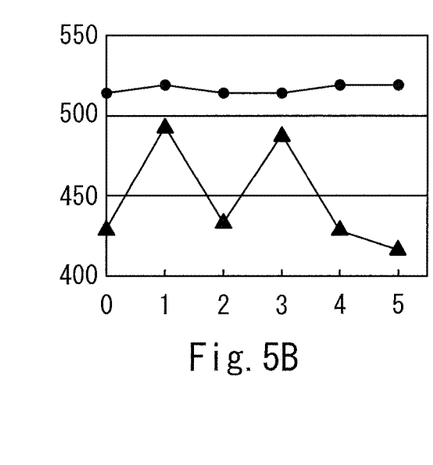

As a result, in the position N1 of the seat surface N of the poppet valve 10 in the inner diameter side, values of 500 or more in Vickers hardness Hv were obtained in all the depths from the seat surface N. On the other hand, on the seat surface NA of the conventional poppet valve, variations in hardness are large depending on the depth from the seat surface NA, and there are positions where the stiffness strength is less than 450 as a target in Vickers hardness Hv (refer to FIG. 5(*b*)).

Figure 5C:
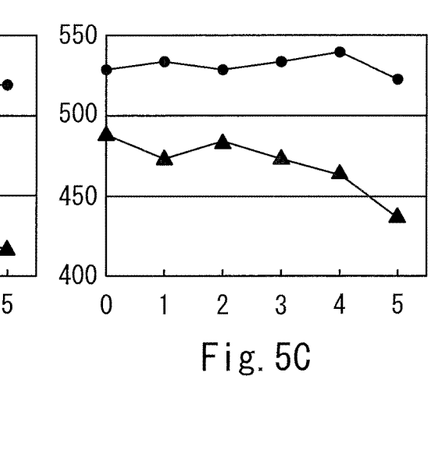
Figure 5D:
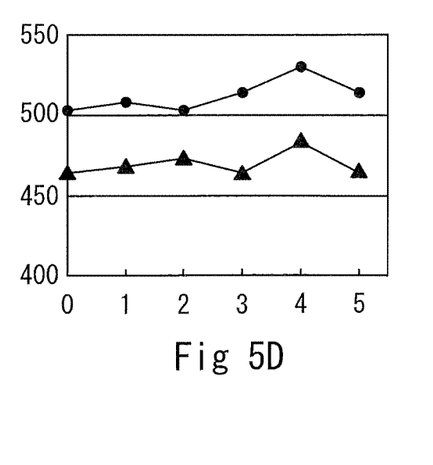

In the position N2 of the seat surface N between the inner diameter side and the outer diameter side, values of 500 or more were obtained in Vickers hardness Hv in all the depths from the seat surface NA. On the other hand, in the conventional poppet valve, the stiffness strength was less than 450 in the deep position from the seat surface NA (position of the depth of 5 mm), and did not reach a value of 450 as a target or more (refer to FIG. 5(*c*)).

In the position N3 of the seat surface N in the outer diameter side, values of 500 or more were obtained in Vickers hardness Hv in all the depths from the seat surface N. On the other hand, even on the seat surface N in the conventional poppet valve, the stiffness strength was values of 450 as a target or more in Vickers hardness Hv, but was the values smaller than the stiffness strength of the seat surface N of the poppet valve 10 manufactured by the manufacture method in the present invention (refer to FIG. 5(*c*)).

As described above, on the seat surface N of the poppet valve 10 manufactured by the manufacture method in the present invention, values over 450 in Vickers hardness Hv as a target in the present invention were obtained in all the measurement spots in a range from the surface to the depth of 5 mm, and values of 500 or more were obtained in all the measurement spots. That is, the values of the stiffness strength in all the measurement spots were larger than those of the seat surface NA of the poppet valve manufactured by the conventional manufacturing method.

As described above, the embodiment, as illustrated in FIG. 1(*b*), provides the method for manufacturing the poppet valve 10, in which the valve head 14 provided in one end of the valve stem 12 in the longitudinal direction has the seat surface N in the direction where the outer diameter is widened toward the one end of the valve stem 12, by forging the intermediate valve products 10' made of the precipitation-hardened Ni-based alloy as illustrated in FIG. 1(*a*), wherein: the intermediate valve products 10' are provided with the intermediate valve head 14' (large diameter part) serving as the valve head 14 after forging in the one end of the valve stem 12' in the longitudinal direction; the intermediate valve head 14' is provided with the pressing protrusions 15 in the region serving as the seat surface N after forging, the pressing protrusions 15 having the peak 15*a* positioned in the normal line X2 direction of the seat surface N on a basis of the seat surface N of the forged valve head 14; in a sectional view, the peak 15*a* of the pressing protrusions 15 is positioned on the normal line X2 passing the reference point P3 set on the line segment K (virtual line) connecting the base point P1 in the inner diameter side and the base point P2 in the outer diameter side of the seat surface N; and as viewed in the axial direction of the center line X1 of the valve stem 12', the position of the reference point P3 is set such that the relation between the length L1 from the base point P1 in the inner diameter side to the reference point P3 and the length L2 from the base point P2 in the outer diameter side to the reference point P3 meets the following formula (1):

$$0 < L1/L2 \leq 0.5 \tag{1},$$

the method comprising the steps of: providing the punch 220 (pressing die) and the die 210 (supporting die) arranged to face with each other in the center axis X1;

supporting the intermediate valve products 10' by the die 210 in a state of causing the pressing protrusions 15 to abut on the pressing surface 215*a* of the shape corresponding to the seat surface N of the die 210 between the punch 220 and the die 210;

thereafter moving the punch 220 in the direction of approaching the die 210 in the center line X1 direction to plastic-deform the region of the pressing protrusions 15 held between the punch 220 and the die 210 in the center line X1 direction; and thus forming the seat surface N of the valve head 14.

In the poppet valve used in the internal combustion engine for marines, in some cases, there occurs indentations on the seat surface of the valve due to combustion residues cutting thereto or there occurs wear on the seat surface of the valve due to collision of the poppet valve with the seat ring.

In this case, the seat surface of the valve on which the indentations have occurred is repaired by polishing for reuse of the poppet valve.

Here, in a case where the seat surface of the poppet valve is not uniformly hardened to the predetermined depth, a section low in hardness emerges on a new seat surface formed by repair (polishing) of the seat surface. Since the poppet valve having the section low in hardness is not suitable for use in an internal combustion engine, the poppet valve in which the seat surface has been repaired cannot be reused.

With the aforementioned configuration, since the portion of the pressing protrusions 15 is moving by being pressed by the pressing surface 215a of the die 210 moves in the region finally serving as the seat surface N from the inner diameter side to the outer diameter side, the amount of the portion in the pressing protrusions 15 that has been plastic-deformed and has moved is distributed to be substantially uniform on the seat surface N of the poppet valve 10 that will be finally obtained. Further, since the moved portion becomes dense, the seat surface N can be uniformly work-hardened to the predetermined depth in a range from the inner diameter side to the outer diameter side of the seat surface N.

As a result, in a case of polishing the worn seat surface for reuse of the poppet valve, since the polished seat surface does not have a section low in hardness until the depth of the seat surface cut by the polishing reaches a predetermined depth, a plurality of times of reuse of the poppet valve is made possible.

In particular, in the intermediate valve head 14' of the intermediate valve products 10', as viewed in the axial direction of the center axis X1 (center line) of the valve stem 12', the position of the reference point P3 is set such that the relation between the length L1 from the base point P1 in the inner diameter side to the reference point P3, the length L2 from the base point P2 in the outer diameter side to the reference point P3, the length L3 from the center axis X1 to the base point P1 in the inner diameter side in the radial direction of the center axis X1, the length L4 from the center axis X1 to the base point P2 in the outer diameter side in the radial direction of the center axis X1, a height Z from the seat surface N to the peak 15a of the pressing protrusions 15, and an angle θ of the seat surface N to the center axis X1 meets the following formulae (2a)-(2c):

$$L2 > L1 \quad (2a)$$

$$(L4-L3) \times \tfrac{1}{2} \leq L2 \leq (L4-L3) \times \tfrac{3}{4} \quad (2b)$$

$$L1 = Z \times SIN^2\theta / COS\,\theta \quad (2c).$$

By thus setting the position of the reference point P3, the position of the peak 15a in the pressing protrusions 15 as viewed in the axial direction of the center axis X1 is arranged closer to the inner diameter side than the intermediate point in the length direction of the line segment connecting the base point P1 in the inner diameter side and the base point P2 in the outer diameter side, and closer to the base point P1 in the inner diameter side.

Therefore the portion of the pressing protrusions 15 that is pressed and moves by the pressing surface 215a of the die 210 moves in the region finally serving as the seat surface N in a wider range from the inner diameter side to the outer diameter side. As a result, the seat surface N of the poppet valve 10 that will be finally obtained can be work-hardened in the wider range thereof. Accordingly it is possible to increase the stiffness strength of the seat surface N in the wider range.

In addition, in the intermediate valve head 14' of the intermediate valve products 10', as viewed in the axial direction of the center axis X1 of the valve stem 12', the height Z from the seat surface N to the peak 15a of the pressing protrusions 15 is set such that a relation between the height Z and the length L3 from the center axis X1 to the base point P1 in the inner diameter side in the radial direction of the center axis X1, the length L4 from the center axis X1 to the base point P2 in the outer diameter side in the radial direction of the center axis X1, and the angle θ of the seat surface N to the center axis X1 meets the following formula (3):

$$Z < ((L4-L3) \times COS\,\theta)/2 \quad (3)$$

Here, as the height Z of the peak 15a of the pressing protrusions 15 from the seat surface N is higher, the position of the peak 15a of the pressing protrusions 15 as viewed in the axial direction of the center axis X1 becomes the closer to the base point P2 in the outer diameter side from the base point P1 in the inner diameter side.

Therefore at the time of pressing the peak 15a of the pressing protrusions 15 by the pressing surface 215a of the die 210, as the position of the peak 15a of the pressing protrusions 15 as viewed in the axial direction of the center axis X1 becomes closer to the base point P2 in the outer diameter side, the portion of the pressing protrusions 15 that is pressed and moves at forging is the more difficult to move to the inner diameter side (base point P1-side) where the valve stem 12' high in stiffness strength is positioned.

Therefore the portion of the pressing protrusions 15 that is pressed and moves at forging moves in the outer diameter side more than in the inner diameter side, and on the forged seat surface N, the work hardening in the inner diameter side is more insufficient than in the outer diameter side.

In the embodiment, the height Z of the peak 15a of the pressing protrusions 15 on a basis of the seat surface N formed after forging is set to meet the relation of the aforementioned formula (3), and thereby the position of the peak 15a as viewed in the axial direction of the center axis X1 is arranged closer to the center axis X1 (closer to the inner diameter).

This is because, since the stress acting on the pressing protrusions 15 at forging is the highest at a starting point (starting point of plastic deformation) of pressing the pressing protrusions 15, the peak 15a of the pressing protrusions 15 is positioned to the valve stem 12' high in stiffness to press the pressing protrusions 15 with a high pressing force at the starting point of plastic deformation, thus making it possible to cause the seat surface N in the side of the valve stem 12'—also to be sufficiently plastic-deformed and be work-hardened.

As a result, the high stress at the press starting point can be used to move the portion of the pressing protrusions 15 to the seat surface N in the side of the valve stem 12'-having high stiffness for work hardening. Therefore the stiffness strength in the inner diameter side of the forged seat surface N can also be increased.

In addition, as illustrated in FIGS. 3(a)-(c), the method for manufacturing the valve is configured such that the pressing surface 215a of the die 210 is inclined in a direction of being away from the center axis X1 toward the punch 220, and the region of the pressing protrusions 15 is plastic-deformed in the radial outside of the center axis X1 and in the punch 220-side by the pressing surface 215a, while forming the final seat surface N.

With this configuration, as illustrated in FIGS. 3(a)-(c), the movement of the portion of the pressing protrusions 15 pressed by the pressing surface 215a of the die 210 is guided from the inner diameter side to the outer diameter side in the region serving as finally the seat surface N by the inclined pressing surface 215a. Therefore the distribution of the portion that has moved on the seat surface N of the poppet valve 10 that will be finally obtained can be made to be more uniform.

As a result, since the stiffness strength of the seat surface N of the produced poppet valve 10 is made to be more uniform, the lifetime of the valve is expected to extend due to an improvement on wear resistance of the seat surface N.

As described above, the method for manufacturing the valve is configured to include a step (solution treatment process) for executing solution treatment of the intermediate valve products 10', and a step (aging treatment process) for executing aging treatment of the intermediate valve products 10' before plastic-deforming the pressing protrusions 15 in the intermediate valve products 10'.

In the intermediate valve products 10', the metallic structure forming the intermediate valve products 10' is in a non-uniform state.

As described above, the intermediate valve products 10' are heated and held, and material components of the intermediate valve products 10' are uniformly melted. Thereafter, when the intermediate valve products 10' are rapidly cooled, the metallic structure can be made in a uniform state (solution) (solution treatment process).

In addition, the intermediate valve products 10' via the solution treatment process is heated for a given time at a constant temperature lower than a heating temperature at the solution treatment process.

As a result, the metallic crystal of the intermediate valve products 10' is micro-structured to obtain hardened precipitated substances in a crystal grain boundary. Therefore material hardness can be further increased (aging hardening).

Further, the method for manufacturing the valve is configured to include a step (annealing treatment process) for, after plastic-deforming the pressing protrusions 15 in the intermediate valve products 10' to mold the final poppet valve 10, executing the annealing treatment of the molded poppet valve 10.

With this configuration, since the seat surface N of the poppet valve 10 that will be finally obtained can be further hardened, the stiffness strength of the seat surface N can be further increased.

In addition, the method for manufacturing the valve is configured such that the plastic deformation of the region in the pressing protrusions 15 is performed at a temperature less than the recrystallization temperature of the precipitation-hardened Ni-based alloy.

When the plastic deformation of the portion in the pressing protrusions 15 is performed at a temperature equal to or more than the recrystallization temperature of the precipitation-hardened Ni-based alloy, the forging work becomes in a solution state to decrease the stiffness strength of the seat surface N. Therefore with the above configuration, it is possible to appropriately prevent a decrease in stiffness strength of the seat surface N.

It should be noted that in the above embodiment, the outer diameter side of the pressing protrusions 15 in the intermediate valve products 10' are formed as the inclined surface 14'b, but may be formed as not such a linearly inclined surface 14'b, but an arc-shaped inclined surface 14"b swollen in a swelling direction.

With this configuration, the pressing surface 215a of the die 210 makes surface contact with the arc-shaped inclined surface 14"b of the pressing protrusions 15, and therefore the pressing surface 215a can make contact with the arc-shaped inclined surface 14"b in a wider range.

As a result, since the stress acting on the arc-shaped inclined surface 14"b of the pressing protrusions 15 from pressing surface 215a uniformly acts in the wider range, the pressing surface 215a is expected to stably press the portion of the pressing protrusions 15 in a predetermined pressing direction.

The present invention is not limited to the aforementioned embodiment, and can include various modifications and improvements made possible within a range of the technical concept.

The following is a list of reference numerals and associated parts as used in this specification and drawings:

| Reference Numeral | Part |
| --- | --- |
| 10 | Poppet valve |
| 10' | Intermediate valve products |
| 12 | Valve stem |
| 12' | Valve stem |
| 14 | Valve head |
| 14' | Intermediate valve head |
| 14' b | Inclined surface |
| 14' c | Inclined surface |
| 14' d | Valve neck |
| 14' e | Upper surface |
| 15 | Pressing protrusions |
| 15a | Peak |
| 141' | Margin part |
| 141a | Boundary point |
| 142' | Valve seat |
| 210 | Die |
| 211 | Upper surface |
| 212 | Die hole |
| 213 | Wall part |
| 214 | Opening wall |
| 215 | Pressing wall |
| 215a | Pressing surface |
| 216 | Space |
| 217 | Space |
| 218 | Hole |
| 219 | Runoff part |
| 220 | Punch |
| 221 | Lower surface |
| N | Seat surface |
| P1 | Base point in an inner diameter side |
| P2 | Base point in an outer diameter side |
| P3 | Reference point |

The term "intermediate valve products 10," as used in the specification, is to be construed to cover both the singular and the plural forms.

The term "pressing protrusions 15," as used in the specification, is also to be construed to cover both the singular and the plural forms.

The scope of the claims should not be limited by the preferred embodiments and examples, but should be given the broadest interpretation consistent with the written description as a whole.

What is claimed is:

1. A method for manufacturing a poppet valve, in which a valve head provided in one end of a valve stem in a longitudinal direction has a seat surface in a direction where an outer diameter is widened toward the one end, by forging an intermediate valve product of the poppet valve, wherein:

the intermediate valve product of the poppet valve is provided with a large diameter part as the valve head in the one end of the valve stem in the longitudinal direction, wherein the large diameter part is provided with a pressing protrusions in a region serving as the seat surface after forging, the pressing protrusions having a peak positioned in a region in a normal direction of the seat surface on a basis of the seat surface of the forged valve head;

the method comprising the steps of:

in a sectional view, the peak of the pressing protrusions is positioned on a normal line passing a reference point set on a virtual line connecting a base point in an inner diameter side and a base point in an outer diameter side of the seat surface; and as viewed in an axial direction of a center line of the valve stem, a position of the reference point is set such that a relation between a length (L1) from the base point in the inner diameter side to the reference point and a length (L2) from the base point in the outer diameter side to the reference point meets the following formula (1):

$$0 < L1/L2 \leq 0.5 \qquad 1)$$

providing a pressing die and a supporting die arranged to face with each other in the center line;

supporting the intermediate valve product of the poppet valve by the supporting die in a state of causing the pressing protrusions to abut on a pressing surface of the supporting die between the pressing die and the supporting die, the pressing surface having a shape corresponding to the seat surface;

thereafter moving the pressing die in a direction of approaching the supporting die in the center line direction to plastic-deform a region of the pressing protrusions held between the pressing die and the supporting die in the center line direction; and thereby forming the seat surface.

2. The method for manufacturing the poppet valve according to claim 1, wherein:

in the valve head of the intermediate valve product of the poppet valve, as viewed in the axial direction of the center line of the valve stem, the position of the reference point is set such that a relation between the length (L1) from the base point in the inner diameter side to the reference point, the length (L2) from the base point in the outer diameter side to the reference point, a length (L3) from the center line to the base point in the inner diameter side in the radial direction of the center line, a length (L4) from the center line to the base point in the outer diameter side in the radial direction of the center line, a height (Z) from the seat surface to the peak of the pressing protrusions, and an angle (θ) of the seat surface to the center line meets the following formulae (2a)-(2c):

$$L2 > L1 \qquad 2a)$$

$$(L4-L3) \times \tfrac{1}{2} \leq L2 \leq (L4-L3) \times \tfrac{3}{4}; \text{ and} \qquad 2b)$$

$$L1 = Z \times SIN^2\theta/COS\,\theta \qquad 2c).$$

3. The method for manufacturing the poppet valve according to claim 1, wherein:

in the valve head of the intermediate valve product of the poppet valve, as viewed in the axial direction of the center line of the valve stem, the position of the reference point is set such that a relation between a length (L3) from the center line to the base point in the inner diameter side in the radial direction of the center line, a length (L4) from the center line to the base point in the outer diameter side in the radial direction of the center line, a height (Z) from the seat surface to the peak of the pressing protrusions, and an angle (θ) of the seat surface to the center line meets the following formula (3):

$$Z < ((L4-L3) \times COS\,\theta)/2. \qquad 3)$$

4. The method for manufacturing the poppet valve according to claim 1, wherein:

the pressing surface of the supporting die is inclined in a direction of being away from the center line toward the pressing die, and the region of the pressing protrusions is plastic-deformed in the radial outside of the center line and in the pressing die-side by the pressing surface, while forming the seat surface.

5. The method for manufacturing the poppet valve according to claim 1, comprising:

a step for executing solution treatment of the intermediate valve product of the poppet valve; and a step for executing aging treatment of the intermediate valve product, before plastic-deforming the pressing protrusions in the intermediate valve product.

6. The method for manufacturing the poppet valve according to claim 1, comprising:

a step for executing aging treatment of the molded poppet valve, after the step of plastic-deforming the pressing protrusions in the intermediate valve product of the poppet valve to mold the poppet valve.

7. The method for manufacturing the poppet valve according to claim 1, comprising:

a step for, after plastic-deforming the pressing protrusions in the intermediate valve product of the poppet valve to mold the poppet valve, executing aging treatment of the molded poppet valve.

* * * * *